United States Patent [19]
Gulakov et al.

[11] 4,346,280
[45] Aug. 24, 1982

[54] METHOD AND APPARATUS FOR BUILDING UP SURFACE LAYER WITH ALTERNATING COMPOSITION

[76] Inventors: Sergei V. Gulakov, ulitsa M.Mazaya, 41, kv.2; Boris I. Nosovsky, ulitsa Kuprina, 23a, kv.30; Leonid K. Leschinsky, prospekt Lenina, 75b, kv.60; Ksenofont K. Stepnov, ulitsa Dalne vostochnaya, 50, kv.4; Anatoly E. Rudnev, bulvar Bogdana Khmelnitskogo, 18, kv.35, all of Zhdanov Donetskoi oblasti, U.S.S.R.

[21] Appl. No.: 164,949

[22] Filed: Jul. 1, 1980

[51] Int. Cl.³ ............................................... B23K 9/04
[52] U.S. Cl. .............................. 219/76.1; 219/137 R; 219/76.14; 219/146.1; 228/225; 228/226; 228/244; 228/8
[58] Field of Search ............... 219/137 R, 76.1, 76.12, 219/73.11, 76.14, 76.16, 121 PL, 146.1; 228/225, 226, 244, 256, 8

[56] References Cited

U.S. PATENT DOCUMENTS

B 260,455  1/1975  Muldes ................................. 219/137

*Primary Examiner*—B. A. Reynolds
*Assistant Examiner*—M. H. Paschall
*Attorney, Agent, or Firm*—Fleit & Jacobson

[57] ABSTRACT

A method comprises feeding two or more, if necessary, alloying materials and simultaneously changing the ratio thereof. The ratio of the alloying materials is changed at the moment of transition from one section to the other one having different composition, the ratio being changed to such extent that the length of the transition portion is as small as possible. The time of transition is determined depending on the weld pool volume, rate of surfacing, cross section of the layer being built up, amount of the alloying elements both the required and the real one. Determining the time of transition for carrying out the method of the invention is disclosed in term of a preferred embodiment. An apparatus for carrying out the method of the invention is characterized in that it includes an adder-differentiator link, a voltage limiter, a switching device and an aperiodical link. The aperiodical link is a simulator of the weld pool. It has an input connected to a control unit which controls the operation of an alloying material feeding device, and is connected through the switching device to the voltage limiter to receive an output signal proportional to the surfacing parameters. The aperiodical link is also connected with two outputs of a surfacing parameters regulating unit for providing an output signal of the voltage limiter in accordance with the surfacing parameters.

2 Claims, 3 Drawing Figures

METHOD AND APPARATUS FOR BUILDING UP SURFACE LAYER WITH ALTERNATING COMPOSITION

BACKGROUND OF THE INVENTION

1. Field of the Invention

The present invention relates to welding practice, and particularly to a method of surfacing to build up a surface layer having different-composed portions and apparatus for carrying out the same.

When building up a surface layer having different-composed portions the weld pool volume influences the size of the transition zone between different-composed portions. This transition zone is always large, which prevents the formation of the surface layer having distinct boundary between the portions having different composition and, hence, different properties. In other words, lack of sharp transition between different portions does not allow producing a surface layer which would feature sufficiently high properties.

2. Prior Art

There is known a method of surfacing with alternating composition (cf. Teoretitcheskie i tekhnologitcheskie osnovy naplavki. Novye protzessy mekhanizirovanoi naplavki. Pod red. I. I. Furmana, Kiev, izd. IES im. E. O. Patona AN USSR, 1977, pp. 102-108), wherein the transition zone is made shorter by varying the amount of alloying elements fed to the weld pool with respect to the amount of these alloying elements required in certain portions of the surface layer being formed. The amount of the elements being fed to the weld pool is varied by a value which is proportional to the forward derivative of the desired law of variation of these elements in the surface layer being formed. In case the composition and, hence, properties to the surface layer being formed has to be varied to a great extent the above method does not yield the desired results, which is due to a limited content of the alloying elements contained in the real electrode and filler materials as well as a limit rate of feeding these materials to the weld pool. With the chemical composition of the surface layer being varied discretely the quantity of the alloying elements being fed to the weld pool according to the prior art approaches infinity, while the duration of their being fed approaches zero, which is not practicable.

There is also known a device for surfacing with alternating composition. ("Avtomaticheskaya svarka", 1978, No. 3, pp. 59-60) permitting the feed rate of electrodes and fillers to be varied in the course of surfacing. This device comprises an actuating mechanism for delivering electrode and filler materials, connected with a control device controlled by a surfacing rate regulating unit through a programmer connected with a comparator device.

However, the prior art apparatus has a limited capability of controlling the size of the transition zones, which capability is determined by the surfacing process that they are designed to carry out.

SUMMARY OF THE INVENTION

An object of the invention is to provide a method of surfacing for building up a surface layer having different-composed portions, permitting the size of the transition zone to be decreased.

Another object of the invention is to provide a method of surfacing for building up a surface layer having different-composed portions, enabling the formation of a surface layer having portions with different properties.

Yet another object of the invention is to provide an apparatus for carrying out a method of surfacing for building up a surface layer having different-composed portions, enabling the objects of the invention to be achieved.

These and other objects of the invention are attained in that in a method for building up a surface layer having different-composed portions, which comprises feeding at least two alloying materials to the weld pool, and varying the ratio of these materials, according to the invention the amount of alloying elements is varied relative to the amount required in certain portions of the layer being built up from 0.01 to 20% when the degree of alloying is lowered and from 0.01 to 100% when the degree of alloying is raised, with this amount being maintained for a period of time determined according to the following equation $$t = \frac{V}{v \cdot A} \cdot \ln \frac{C_1 - C_2}{C_1 - C_3}$$

where $V$ = weld pool volume, $v$ = rate of surfacing, $A$ = cross-section of the surface layer being formed, $C_1$ = amount of alloying elements fed to the weld pool and varied relative the required amount, $C_2$ = reference amount of alloying elements fed to the weld pool, relative to which reference amount the amount of the alloying materials is varied;

$C_3$ = required amount of the alloying elements in the surface layer being formed, whereafter the quantity of the alloying elements is changed to the required amount.

This method makes it possible to build up a surface layer with a real chemical composition variation being close to the desired one, which is attained due to a smaller transition zone.

The elements like carbon are capable of changing to a great extent the properties of the metal being deposited, even when their content therein is varied to a small value. This accounts for the fact that a lower limit of the content of the alloying or filler materials is equal to 0.01%.

The other alloying elements, such as chromium, nickel, can substantially change the property of the metal being deposited, only provided that their content is high. Therefore the upper limit of the content of these alloying materials is selected equal to 20% when the degree of alloying is required to be lowered, and 100% when this degree of alloying should be raised. Decreasing the transition zone in the case of increasing the alloying degree can be attained with a better result if one of the electrodes contains 100% of the alloying material, and 0.01% when the alloying degree is decreased.

If the pattern of variation of the chemical composition differs from a descrete one, the composition variation curve is divided into separate portions on which varying the composition is done descretely from one value to another one, the frequency of variation is selected depending upon the curve character and the required accuracy of correspondence of a real composition obtained to the required one.

The method of the invention is carried out by an apparatus for building up a surface layer having different-composed portions, which comprises an actuating mechanism for feeding electrode and filler materials, connected with a control unit controlled by a unit for regulating the surfacing parameters through a programmer connected to a comparator device, and which according to the invention further includes an adder-differentiator link, a voltage limiter, a switching device, and an aperiodical link, with the adder-differentiator link being connected to the output of the programmer and to the voltage limiter having its output connected, through the switching device controlled by the comparator device, to the aperiodical link and to the control unit for controlling the actuating mechanism, with the switching device having its two other outputs connected to the parameters regulating unit, and the aperiodical link having its output connected to the comparator device.

Such construction of the apparatus incorporating the aperiodical link simulating the weld pool, makes it possible to take account of the conditions determining the size of the transition zone and thus to keep the amount of the alloying material in such limits which would enable decreasing of this zone.

BRIEF DESCRIPTION OF THE DRAWINGS

These and other objects of the invention will become apparent from the reading of the following description of the preferred embodiment thereof which is represented in the accompanying drawings, wherein.

DETAILED DESCRIPTION OF THE PREFERRED EMBODIMENT OF THE INVENTION

Figure 1:
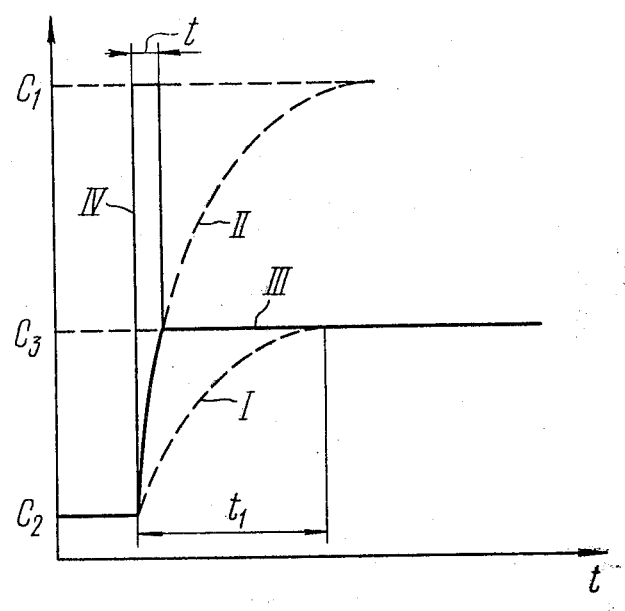
FIG. 1 is a graph of variation of the alloying material content in the metal being deposited.

Referring now to FIG. 1 wherein on the abscissa the time t is plotted, and the ordinate is the content C of the alloying elements in %%, the curves I and II represent a variation form of the alloying material content in the layer being built up with a descrete varying the degree of alloying from $C_2$ to $C_3$, and from $C_2$ to $C_1$ respectively. Heavy curve III shows a variation form of the alloying material content in the case of increasing the degree of alloying to exceed the required one up to $C_1$ for a time t, whereafter the amount of the alloying materials fed to the weld pool is decreased to $C_3$.

The invention will now be explained in terms of a specific embodiment.

Surfacing was done with the use of two electrodes having different chemical composition, namely, the electrode I formed of a low-carbon non-alloyed steel, and the electrode II made from a low-carbon high-alloyed steel containing 25% Cr and 13% Ni. By varying ratio of the feed rates of the electrodes, with the total feed rate being constant, the content of chromium in the surface layer being built up was varied in the range from 0 to 25% and that of nickel from 0 to 13%. For instance, the chrome content in the surface layer being built up is to be sharply changed from 0 to 10%. If in the required moment the ratio $(v_I/v_{II})$ of the rate of feeding electrodes is changed from 1 to 0.6, then the time of change of the chromium content will be about 6s., and the length of the transition zone 6 cm with v=1 cm/s, V=30 m³, A=1.5 cm², and for changing the chromium content from 0 to 9.9% will be 9s and 9 cm respectively.

For speeding up the transition process the electrode I material was fed to the weld pool in the amount of 0% in a unit time instead of 60%, while the electrode II material was fed in the same period of time in the amount of 100% instead of 40%. This proportion of the electrodes I and II was maintained until the chromium content in the surface being built up reached 10%, whereafter the ratio of the feed rate of these electrodes was changed to the required one, i.e. to $(v_I/v_{II})=0.6$.

The period of time during which the alloying process was maintained on the extreme level (maximum or minimum) and, hence, the time of the transition period was equal:

$$t = \frac{V}{v \cdot A} \cdot \ln \frac{C_I - C_2}{C_I - C_3} = \frac{3}{1 \times 1.5} \cdot \ln \frac{25 - 0}{25 - 10} = 1s$$

where

V = weld pool volume; v = surfacing rate; A = cross-section of the surface layer being built up; $C_1$ = amount of the alloying elements fed to the weld pool, and varied with respect to the required amount;

$C_2$ = reference amount of the alloying elements fed to the weld pool, relative to which reference amount the amount of the alloying elements is varied;

$C_3$ = required amount of the alloying elements in the surface layer being built up. In this case the length of the transition zone became 1 cm long.

The above example illustrates that the length of the transition zone was decreased 6–9 times by increasing the degree of alloying above the required one 2.5 times during a time t=Is.

It is obvious that the degree of alloying cannot be increased to exceed the extreme level/in this particular case more than 2.5 times/with the total feed mass rate being kept constant. In other words, the time length of alloying on the extreme level is determined by the weld pool volume, cross-sectional area of the surface layer being built up, rate of surfacing, as well as maximum amount of the required element in the electrode and alloying materials and the required range of variation of the amount of this element in the surface layer being built up.

Figure 2:
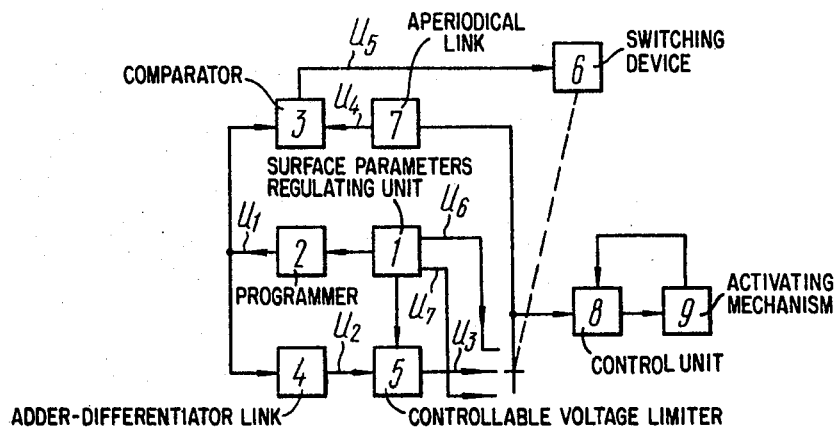
FIG. 2 is a functional diagram of the apparatus of the invention.
Figure 3:
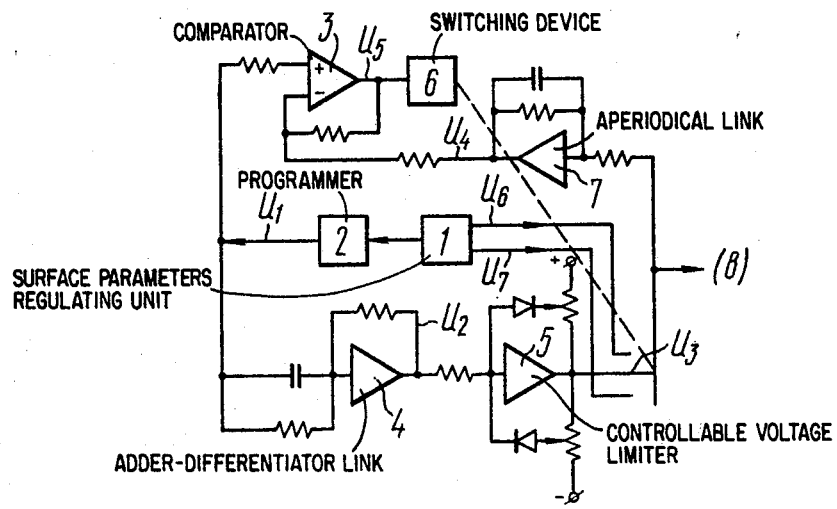
FIG. 3 is a key diagram of the apparatus of the invention.

An apparatus of the invention for carrying out the method of the invention, represented in FIG. 2 in the form of a block diagram, comprises a surfacing parameters regulating unit 1 adapted for determining a total feed mass rate of the alloying elements fed to the weld pool and constructed in this embodiment in the form of a controllable voltage divider/FIG. 3/, and a programmer 2 connected to the output of the unit 1. The programmer 2 may be constructed on the basis of a photo or induction or other types of converters. Connected to the output of the programmer 2 is a comparator device 3, and an adder-differentiator link 4 having its output connected with the input of a controllable voltage limiter 5 controlled by a signal applied from the unit 1 output. The voltage limiter 5 output is connected through a switching device 6 with the outputs of a unit 7 which is an aperiodical link. The apparatus of the invention further includes a control device for controlling an actuating mechanism 9. The unit 7 is also connected with the comparator device 3. In this embodiment the units 3, 4, 5, 7 are constructed on the basis of operational amplifiers/FIG. 3/. The control unit 8 may be thyristor, transistors or magnetic amplifiers based, or otherwise constructed. The actuating mechanism represents a number of electric motors depending on the number of the electrodes used and the preferred arrangement of this mechanism.

The apparatus of the invention operates as follows. When a signal $U_1$ generated in the programmer 2, having its extreme values proportional to the surfacing parameters determined by the unit 1, is applied to the input of the adder-differentiator link 4 at the output of the latter there appears a signal $U_2$/FIGS. 2 and 3/. Simultaneously the signal $U_1$ is applied to the comparator unit 3. From the output of the adder-differentiator link 4 the signal $U_2$ is applied to the input of the controllable voltage limiter 5 limiting this signal to a level proportional to the surfacing parameters determined by the unit 1. A signal $U_3$ at the output of the voltage limiter 5 is equal to the signal $U_2$ only to the moment the limiting is started, and with the signal $U_2$ being further varied the signal $U_3$ remains on its extreme level. Thereafter the signal $U_3$ is applied to the aperiodic link 7 simulating the weld pool. From the output of the link 7 a signal $U_4$ is applied to the second input of the comparator device 3. Until the signal $U_2$ is limited the signals $U_1$ and $U_4$ applied to the inputs of the comparator device 3 remain equal to each other and a useful signal at the output of the comparator device does not appear.

If the sum of the differentiating signal and the programme signal obtained in the link 4, equal to $U_2$ and proportional to the required degree of alloying exceeds a real capabilities of the alloying element feeding means and a maximally possible amount of the alloying materials delivered to the weld pool the signal $U_2$ begins to be limited in the voltage limiter 5. In this case the signal $U_4$ is not equal to the signal $U_1$ and at the output of the comparator device 3 there will appear a signal $U_5$ having a polarity corresponding to a minus symbol of the signals $U_1$ and $U_4$.

The signal $U_5$ controls the switching device 6 operation switching the input of the unit 7 from the output of the voltage limiter 5 to the unit 1. From the outputs of the unit 1 the signals $U_6$ and $U_7$ are applied, depending on the sign of the signal $U_5$, to the inputs of the unit 7 and of the control unit 8. The signals $U_6$ and $U_7$ are equal to the signals which are required for providing extreme values of the feed rate of the alloying materials/for example minimum or maximum r.p.m of the electric motors of the electrode feed drives/. The duration of feeding the alloying elements to the weld pool at an extreme speed is determined by the time of connecting the sources of the signals $U_6$ and $U_7$ to the unit 7 and lasts until the real and the required degrees of alloying correspond to one another, whereafter the input of the unit 7 will be connected again to the output of the voltage limiter 5.

While the invention has been described herein in terms of the preferred embodiments, numerous variations may be made therein without departing from the invention as set forth in the appended claims.

We claim:
1. A method of building up a variable-composition metal layer on a metal blank, comprising the steps of:
supplying at least two alloying materials to a metal zone melted by an arc and restricted by a solidification boundary;
varying the ratio of said alloying materials with respect to the required amount of certain portions of the built-up layer within 0.01 to 20% for a decrease in the alloying degree and within 0.01 to 100% for an increase in the alloying degree; and
maintaining said ratio for a period of time determined from the following relationship:

$$t = \frac{V}{v \cdot A} \cdot \ln \frac{C_1 - C_2}{C_1 - C_3},$$

where
V is the volume of the metal melted by the arc and restricted by the solidification boundary,
v is the building-up rate,
A is the cross-sectional area of the built-up layer,
$C_1$ is the amount of alloying elements varied with respect to the necessary amount,
$C_2$ is the initial amount of alloying elements relative to which variations are made, and
$C_3$ is the required amount of alloying elements in the built-up layer and subsequent changes in the amount of alloying elements to reach the required level.

2. A method of building up a variable-composition metal layer on a metal blank, comprising the steps of:
supplying at least two alloying materials to a metal zone melted by an arc and forming a weld pool;
varying the ratio of said alloying material with respect to the required amount of certain portions of the built-up layer within 0.01 to 20% for a decrease in the alloying degree and within 0.01 to 100% for an increase in the alloying degree; and
maintaining said ratio for a period of time determined from the following relationship:

$$t = \frac{V}{v \cdot A} \cdot \ln \frac{C_1 - C_2}{C_1 - C_3},$$

where
V is the volume of the metal melted by the arc and restricted by the weld pool,
v is the building-up rate,
A is the cross-sectional area of the built-up layer,
$C_1$ is the amount of alloying elements added to the weld pool varied with respect to the necessary amount,
$C_2$ is the initial amount of alloying elements added to the weld pool, relative to which variations are made, and
$C_3$ is the required amount of alloying elements in the built-up layer and subsequent changes in the amount of alloying elements to reach the required level.

* * * * *